(12) United States Patent
Campbell et al.

(10) Patent No.: US 7,698,545 B1
(45) Date of Patent: Apr. 13, 2010

(54) COMPUTER CONFIGURATION CHRONOLOGY GENERATOR

(75) Inventors: Robert E. Campbell, Ft. Collins, CO (US); Shane Unruh, Ft. Collins, CO (US); John R. Diamant, Ft. Collins, CO (US); Keith R. Buck, Ft. Collins, CO (US); Evan R. Zweifel, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 847 days.

(21) Appl. No.: 11/409,754

(22) Filed: Apr. 24, 2006

(51) Int. Cl.
*G06F 15/177* (2006.01)
(52) U.S. Cl. .................. 713/1; 709/224; 709/221; 709/223
(58) Field of Classification Search .................. 713/1; 709/224, 221, 223
See application file for complete search history.

(56) References Cited

U.S. PATENT DOCUMENTS

| | | | | |
|---|---|---|---|---|
| 6,466,972 | B1* | 10/2002 | Paul et al. | 709/222 |
| 6,826,715 | B1* | 11/2004 | Meyer et al. | 714/37 |
| 2002/0078382 | A1* | 6/2002 | Sheikh et al. | 713/201 |
| 2002/0089528 | A1* | 7/2002 | Hay et al. | 345/712 |
| 2003/0149756 | A1* | 8/2003 | Grieve et al. | 709/223 |
| 2004/0044643 | A1* | 3/2004 | deVries et al. | 707/1 |
| 2004/0230681 | A1* | 11/2004 | Strassner et al. | 709/226 |
| 2004/0267932 | A1 | 12/2004 | Voellm | |
| 2005/0091291 | A1* | 4/2005 | Kaler et al. | 707/203 |
| 2005/0278338 | A1 | 12/2005 | Todorova | |
| 2006/0041658 | A1* | 2/2006 | Nelson et al. | 709/224 |
| 2006/0100972 | A1* | 5/2006 | Chianese et al. | 707/1 |
| 2006/0242183 | A1* | 10/2006 | Niyogi et al. | 707/101 |

* cited by examiner

*Primary Examiner*—Thomas Lee
*Assistant Examiner*—Vincent T Tran

(57) ABSTRACT

The present invention provides a computer system with a chronology generator for generating a chronology for a series of computer configurations.

8 Claims, 5 Drawing Sheets

VIRTUAL MACHINE GENEALOGY 19

COMPUTER CONFIGURATION CHRONOLOGY GENERATOR

BACKGROUND OF THE INVENTION

Herein, related art is discussed to aid in understanding the invention. Related art labeled "prior art" is admitted prior art; related art not labeled "prior art" is not admitted prior art.

Due to ever increasing and changing demands for computer resources, computer systems are often reconfigured, e.g., rearranged or expanded. In complex server environments, changes to server configurations must be carefully planned. Some server administrators manually prepare documents that represent the current configuration and use these to plan changes. However, such documents take a lot of time to create, are prone to mistakes, can easily become out of date, and may be difficult to locate when they are needed to return to a previous configuration.

The problems in tracking configuration changes are even more complex when the configuration changes involve virtual machines. A virtual machine can be used in exactly the same manner as a physical computer, but it also allows for powerful models in which it is created for a limited duration to accomplish a specific task and is then discarded like a paper cup. In this model, traditional systems analysis runs into two problems: 1) the target system may not exist by the time analysis is complete; 2) the issues found in the target system may have been passed onto children that did not exist when analysis was initiated.

BRIEF DESCRIPTION OF THE DRAWINGS

The following drawings are of embodiments/implementations of the invention and not of the invention itself.

DETAILED DESCRIPTION

Figure 1:
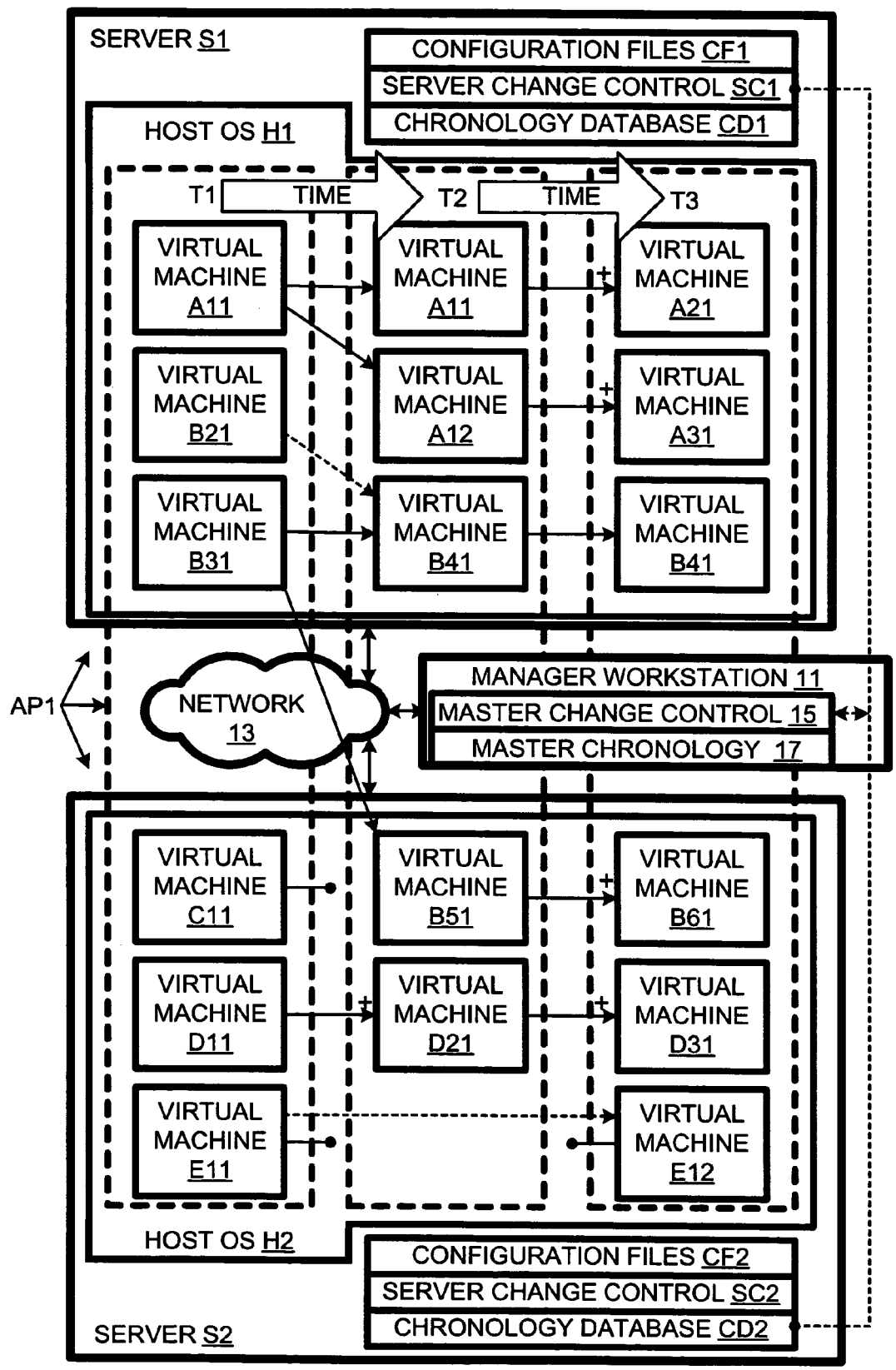
FIG. 1 is a schematic illustration of a computer system in accordance an embodiment of the invention. The pluses in FIG. 1 indicate virtual machine updates.

A server environment AP1 in accordance with the invention includes two servers S1 and S2, a manager workstation 11, and a network infrastructure 13 communicatively connecting the foregoing servers to each other, as shown in FIG. 1. Each server S1, S2 hosts virtual machines, the number, characters, and configurations of which can change over time. For example, at time T1, server S1 hosts virtual machines A11, B21, and B31, while server S2 hosts virtual machines C11, D11, and E11. At time T2, server S1 hosts virtual machines A11, A12, and B41, while server S2 hosts virtual machines B51 and D21. At time T3, server S1 hosts virtual machines A21, A31, and B41, while server S2 hosts virtual machines B61, D31, and E12.

Virtual machines A11, B11, C11, D11, E11, and E12 were generated from media, e.g., installation disks or images. Virtual machines A12 and B51 were generated by cloning virtual machines A11 and B31, respectively. Virtual machines A21, A31, B61, D21, and D31 were generated by applying updates to their respective parent virtual machines.

Figure 2:
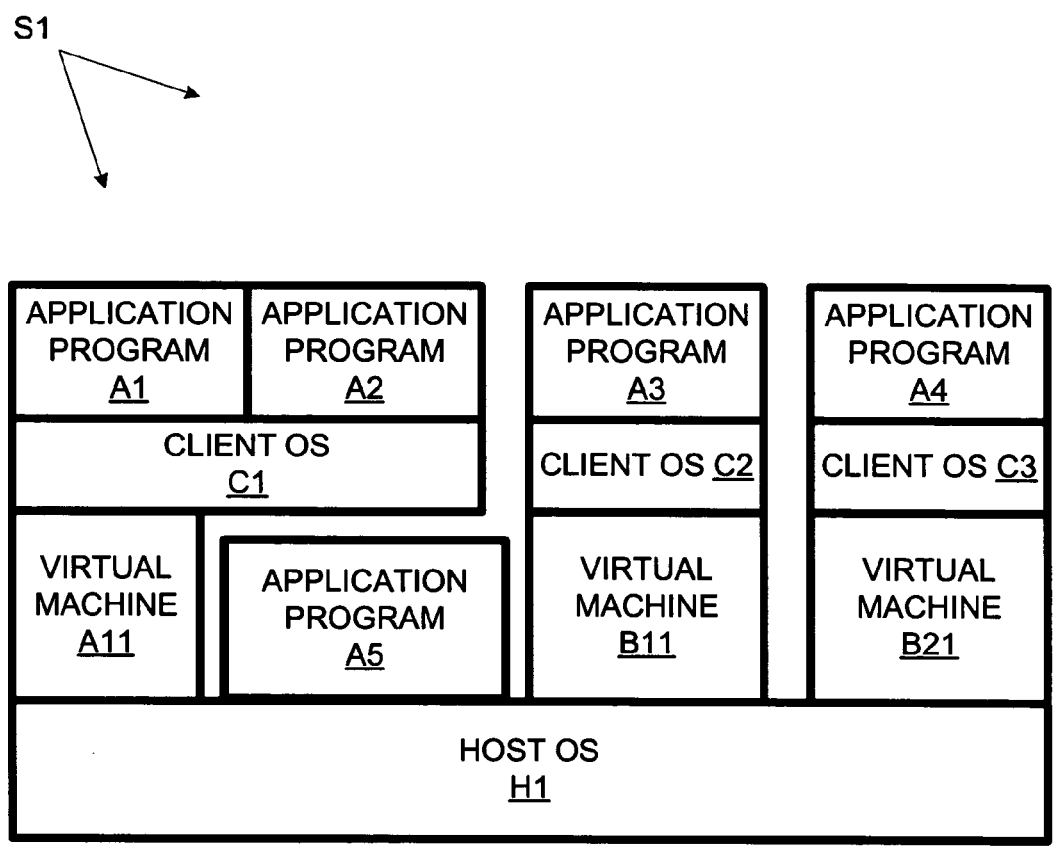
FIG. 2 is a block diagram showing hierarchical relations among components of a server of the system of FIG. 1.

Server S1 has a host operating system H1, that hosts virtual machines, e.g., virtual machines A11, B21, and B31 at time T1. Each virtual machine can run a client operating system, e.g., client operating system C1 runs on virtual machine A11, client operating system C2 runs on virtual machine B11, and client operating system C3 runs on virtual machine B21, as shown in FIG. 2. Each client operating system can host one or more application programs, e.g., client operating system C1 hosts application programs A1 and A2, client operating system C2 hosts application program A3, and client operating system C3 hosts application program A4. Also, host operating system H1 can support application programs, e.g., application program A5, directly.

The invention provides for single and multiple server environments. Each server can be unpartitioned (have a single partition) or can be divided into plural hard partitions. A server or server partition can host zero, one, or plural virtual machines. A master change control program can run on a separate workstation, as in server environment AP1, or on a partition of one of the servers being chronicled. The host operating system is typically provided by the server manufacturer, while the client operating systems are often chosen for their compatibility with the application programs the customer desires to run; the virtual machines are chosen to interface the client operating systems with the host operating system.

Host operating system H1 of server S1 maintains configuration files CF1, which collectively specify the current configuration of server S1, including hardware and software resources, information such as processor type and power modes, the name and version number of operating system H1, specifications for any hard partitions, including what resources they include, specifications for virtual machines including their resource requirements, client operating systems, operating parameters, application program versions and patch levels. In the case of virtual machines, the date of the most recent installation or cloning and some current configuration data are represented in configuration files CF1. For example, configuration data reflecting features that can affect resource utilization are represented in configuration files CF1, while some less impacting configuration changes, e.g., color schemes, are not. Data regarding clone ancestors and descendants are maintained.

Server change control (SCC) SC1 controls configuration changes and stores configurations as a function of time, both on a scheduled basis and in response to configuration change events. Server change control SC1 monitors configuration files CF1, and makes a log of any changes to them. Also, server change control SC1 records the data in configuration files as a function of time periodically. In addition to information obtained from configuration files CF1, server change control can poll hardware and software entities for their configuration information. The series of configurations and events is stored in chronology database CD1.

Server change control SC1 can read the configuration of the server S1 from configuration files CF1 and store its configuration in chronology database CD1. A time (e.g., date) and a revision number are assigned to each configuration stored. In alternative embodiments, a serial number can be assigned in lieu of a time stamp.

Any stored configuration can be tagged with one or more descriptive names. Each name can be used to refer to that configuration in the same way that the revision number or date can be used. Changes can be made to any stored configuration without changing the actual configuration of the server. These changed configurations can be stored in chronology database CD1 with their own tags, version numbers, and dates. Anything that can be done to a stored configuration that came from the server's configuration can also be done to these modified configurations. Server change control SC1 can be configured to query the server at set times and compare the current configuration to a stored configuration. If they differ it can notify the administrators of the server.

Server change control SC1 can display the differences between any two previously stored configurations. It can do this based on date or revision number. It can also display the differences between the current configuration of the server and any previously stored configuration. It can take any previously stored configuration and restore the server to that configuration, provided that all the hardware and software that was present when the configuration was first stored is still present. In some cases, e.g., where there is hardware or software missing, where an earlier configuration cannot be restored automatically, server change control SC1 provides directions on how an administrator can restore the system. Host H2, server change control SC2, configuration files CF2, and chronology database CD2 have analogous roles with respect to server S2.

Manager workstation 11 runs a master server change control program 15 that maintains a master chronology database 17 for server environment AP1. Master change control 15 performs a function with respect to server environment AP1 that is in many ways analogous to the functions of server change controls SC1 and SC2 with respect to their respective servers. Server change controller 15 periodically poles server change controls SC1 and SC2 over network 13 for updates to chronology databases CD1 and CD2, respectively.

Master change control 15 uses the data so obtained to update master chronology database 17. In addition, master change control 15 records environment wide configuration and other configuration changes, including the addition and removal of servers, changes in partitioning, etc. Change controls 15, SC1, and SC2 provide for automatic saving of the current configuration, discovery of unplanned changes, for convenient determination of the differences between two configurations, and automatic or guided restoration of prior configurations.

Server change controllers SC1, and SC2 generate virtual machine genealogies like those shown for servers S1 and S2 in FIG. 1. Master change control 15 generates virtual machine genealogies that span servers S1 and S2, as shown in FIG. 1 as a whole. Some portions of a genealogy are discussed below.

At time T1, virtual machine A11 is on server S1. It is also present at time T2, but now has a clone A12. The original is reconfigured to yield virtual machine A21 at time T3. In the meantime, clone A12 is updated (e.g., with a manufacturer-distributed patch) to yield virtual machine A31. This is a very useful genealogy pattern. It allows virtual machine A11 to continue running while a clone is updated and tested before assuming the task virtual machine A11 was handling. Examining the chronology for descendants of virtual machine A11, it is easy to see that two different versions of the virtual machine coexist. If further instances of this virtual machine are to be generated, it will make a difference whether A21 or A31 is cloned.

The future for virtual machines A21 and A31 can be similar to the illustrated genealogical segment for virtual machines B21 and B31 on server S1 at time T1. Virtual machine B31 is an update of a clone of the virtual machine B21. Once virtual machine B31 is validated, the task and configuration for virtual machine B21 is transferred to virtual machine B31, yielding virtual machine B41. (The dashed arrow from virtual machine B21 to virtual machine B41 indicates a transfer of configuration data and task). Virtual machine B41 persists through time T3, while virtual machine B21 has been inactivated by time T2.

Virtual machine B31 also spawns a clone, virtual machine B51, on server S2 at time T2. This clone is updated on server S2 at time T3 to yield virtual machine B61. Possibly the task performed by virtual machine B41 on server S1 will be transferred to virtual machine B61 on server S2 in accordance with a resource reallocation event. Upon such a transfer, virtual machine B41 can be inactivated, saving computing resources on server S1.

Server S2 hosts a virtual machine C11 at time T1, but this virtual machine is terminated before time T2, e.g., because the task it was responsible for had been completed. Server S2 also hosts a virtual machine D11, which is updated to virtual machine D21 at time T2, and then again to virtual machine D31 at time T3. Server S2 hosts a virtual machine E11 at time T1, but that virtual machine is terminated by time T2. However, it is reactivated so as to yield virtual machine E12 at time T3; a different identity is assigned to indicate the intervening discontinuity. The dotted line between virtual machines E11 and E12 shows that the configuration of virtual machine E11 is transferred to virtual machine E12.

Figure 3:
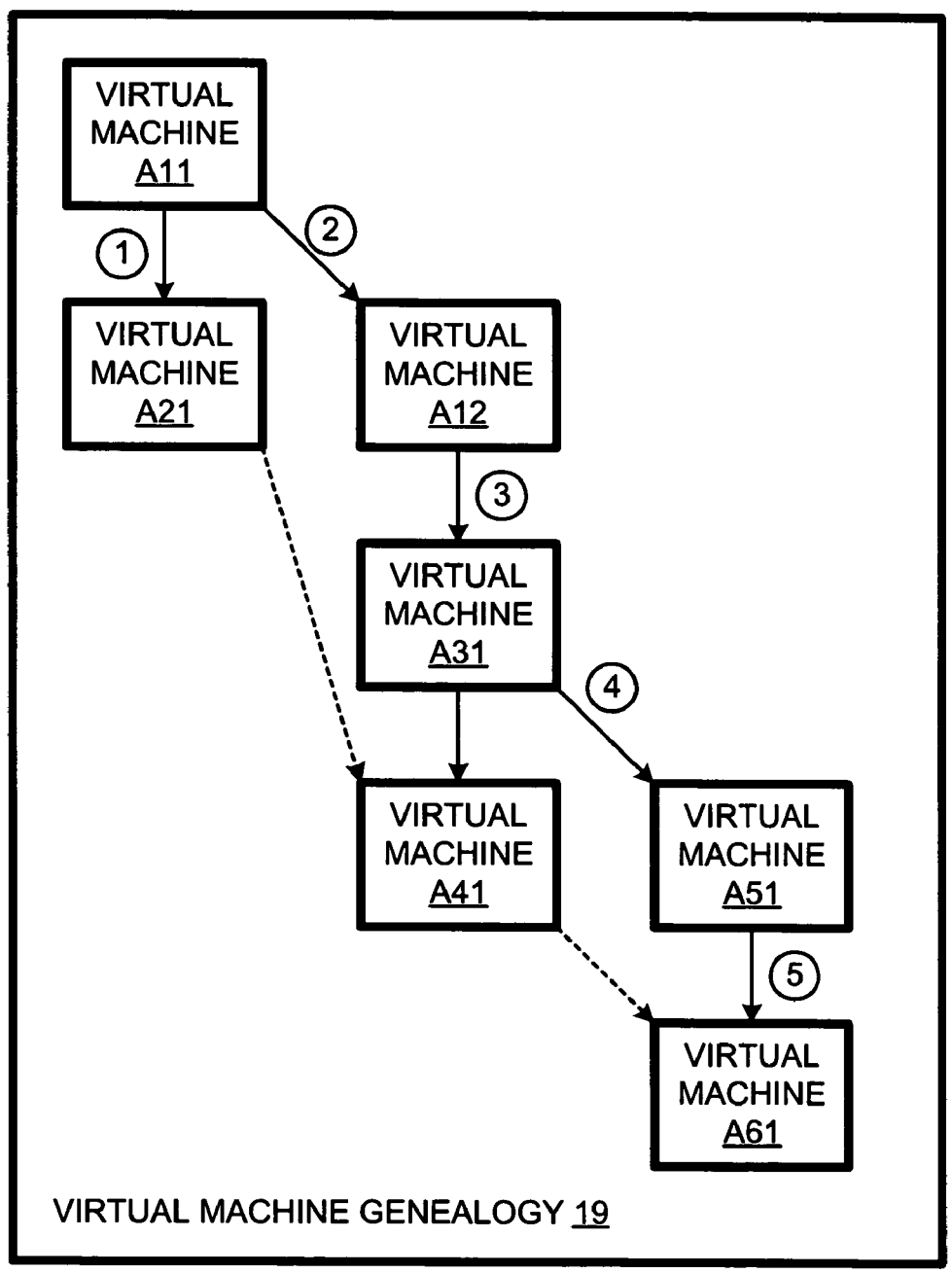
FIG. 3 is a block diagram of a sample genealogy for the system of FIG. 1. Note that the sample genealogy shown in FIG. 3 is related to but not the same as a sample genealogy shown in FIG. 1.

FIG. 3 shows an extended genealogy 19 from virtual machine A11 that extends beyond the time frame represented in FIG. 1. In this genealogy, vertical downward lines represent updates or configuration changes; while diagonal solid lines indicate clones, and dashed oblique lines indicate configuration transfers from one virtual machine to another. Thus, FIG. 3 shows a couple of clones that are upgraded and tested before tasks run by ancestors are transferred to descendants. In particular, virtual machine A51 is generated by cloning A31, while virtual machine A31 becomes virtual machine A41 when it adopts the configuration of virtual machine A21. After virtual machine A51 is validated, it assumes the configuration of virtual machine A41, yielding virtual machine A61.

FIG. 3 also illustrates a metric for measuring diversity among different families of software entities such as virtual machines. The circled numbers are counts from virtual machine A21 to virtual machine A61. The counts are along connected pairs of virtual machines. As these two virtual machines are farther apart than other pair in FIG. 3, the measure of their separation serves as a measure of diversity for the entire family of virtual machines in FIG. 3. Alternatively, the sum of the separations of all pairs in a family can serve as a metric, as can a sum of squares of the separations. Also, a diversity metric can employ various weighting schemes, Hemming distances, etc. Note that the diversity metric for unrelated entities can be considered infinite.

This diversity metric has a number of uses. For example, in a tightly controlled production environment, a high diversity value might indicate more diversity than is desired. For example, distantly related members of a family are less likely to have been updated in the same way. Accordingly, a genetic algorithm could be used to indicate when members of a virtual machine family need to be checked for conformity. If family members are confirmed to be "out-of-sync", a favored virtual machine can be picked and its clones can replace more distant family members.

In some contexts, a high diversity value can be preferred. For example, during stability testing of new software, clones can be generated and reconfigured. The diversity measure can be used to ensure that a sufficient number of different configurations have been tested for reliability to be confirmed. Similarly, diversity can be helpful in tuning kernel parameters. Another use for a diversity measure applies where multiple variations of a program or virtual machine are used to better withstand attack from a non-mutating virus by replacing infected virtual machines with clones of surviving virtual machines.

From a display of the genealogy of FIG. 3, it is also possible to generate comparisons and restorations of virtual machines, even between siblings and cousins. With access to the genealogy, analysis can be performed on the behalf of an ancestor virtual machine with the results causing actions to be taken across all descendants. In the "traditional" model this might be the installation of a patch, and in the "disposable virtual machine" or "paper cup" world each virtual machine in a family would transfer its tasks to a virtual machine belonging to a new "family" and then expire. The use of this family tree could also be used to identify equivalent sources for use in cloning busy virtual machines.

While the genealogical analysis will typically apply to descendant clones, the analysis can also be applied to a characterization of a parent of a clone based on an analysis of the child clone. For example, an administrator might be responsible for performing a detailed security analysis of production level machines. It may be due to load and or due to data security concerns that the administrator is not allowed access to the production nodes. A child node could be created for the purpose of the analysis where the "true" target was the parent and all cousins.

Figure 4:
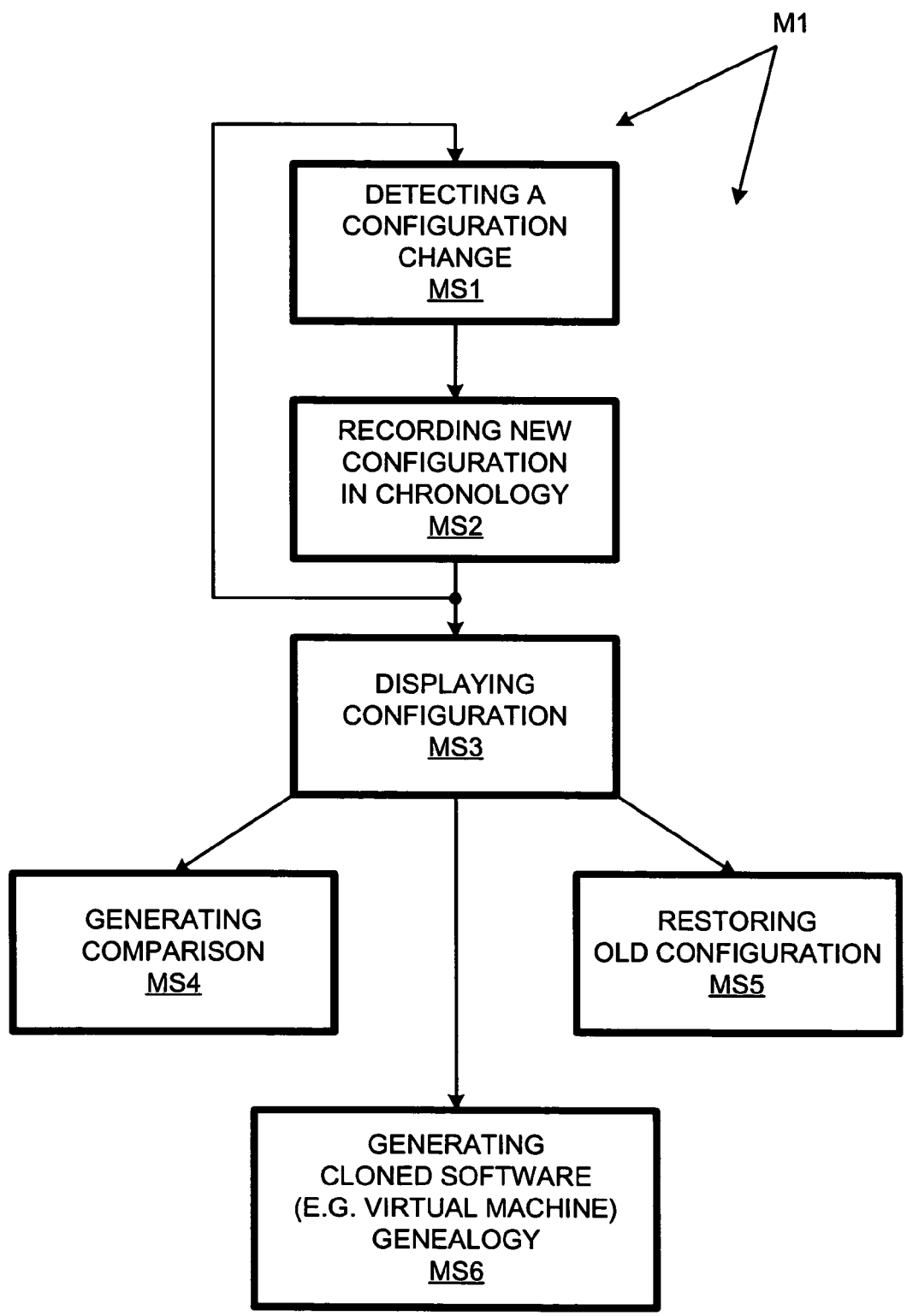
FIG. 4 is a flow chart of a method in accordance with an embodiment of the invention.

A method M1 of the invention is flow-charted in FIG. 4. A configuration change is detected at method segment MS1. Of course, if the server change control function directs the configuration change, the detection is automatic. However, if another entity directs the configuration change, it can inform the server change control function of the change. Also, the server change control function samples configurations periodically (e.g., hourly) so that it can detect configuration changes even without such notice. At method segment MS2, the new configuration is recorded in the chronology database, which contains configuration descriptions and time-stamp data to indicate their relative order in the chronology.

At method segment MS3, information regarding one or more configurations is displayed, e.g., on a computer monitor. From this display, a user can request a comparison of a configuration with its predecessor or between any two selected configurations at method segment MS4. Alternatively, at method segment MS5, by right clicking on graphical or textual representations of non-current configurations and selecting "restore" from a pop-up menu (or other selection means), a user can cause the selected configuration to be restored. The restoration can be automatic if all the enabling software and hardware is in place. Otherwise, the server change control function can generate instructions for restoring the earlier configuration. With alternative embodiments, e.g., with other user interfaces, users may avail themselves of other facilities for inputting commands.

The present invention provides the ability to manage a family of dynamic, cloned virtual machines as a group rather than as a set of individual systems. Each node is identified by name and time-stamp of the last reconfiguration. Each reconfiguration is identified as a change to installed software or to configurable parameters. This approach provides a valid analysis even when: 1) the target system may not exist by the time analysis is complete; and 2) the issues found in the target system may have been passed onto children that did not exist when analysis was initiated.

The data can be stored under two different models. A central repository can be maintained on the non-virtual server as in chronology databases CD1 and CD2. In an alternative embodiment, each virtual machine can record and update a local database. In either case, full data for descendants and cousins are recorded.

Figure 5:
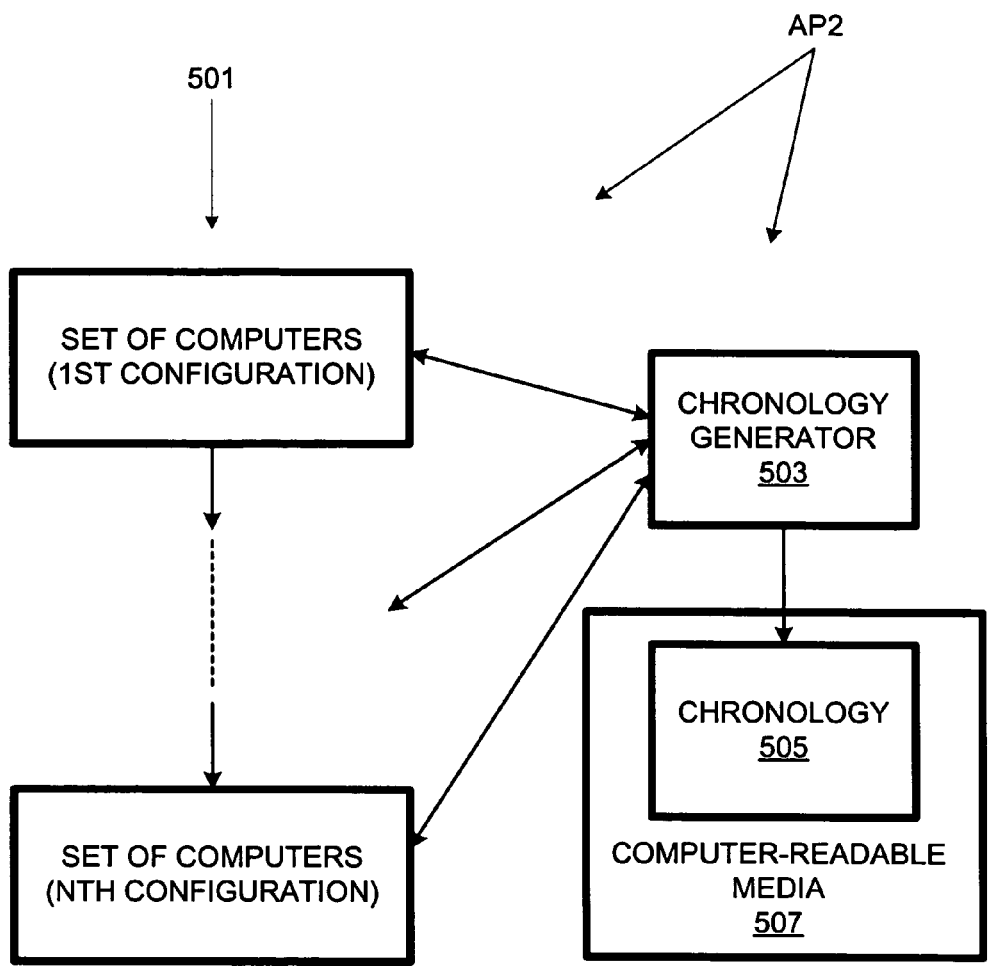
FIG. 5 is a schematic illustration of a second computer system in accordance with an embodiment of the invention.
Figure 6:
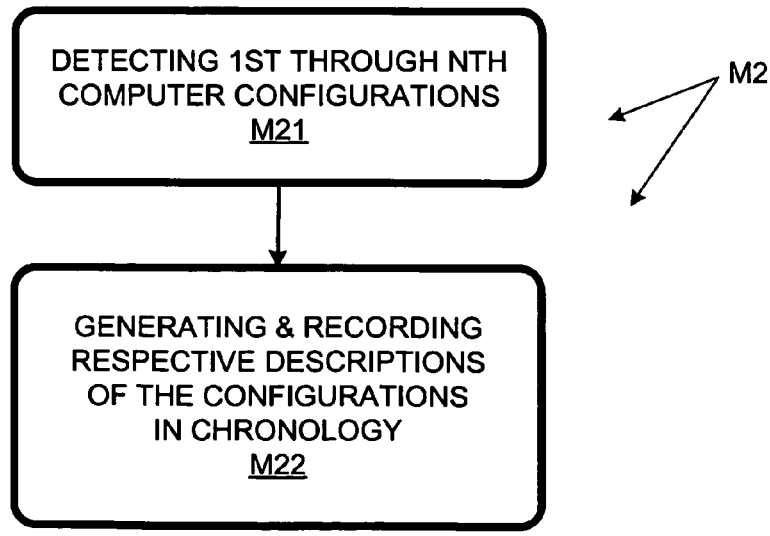
FIG. 6 is a flow chart of a second method in accordance with an embodiment of the invention.

A second computer system AP2 in accordance with an embodiment of the present invention is shown in FIG. 5. Computer system AP2 includes a set of computer 501 that undergoes a series of configuration changes from a $1^{st}$ configuration to an nth configuration. A chronology generator 503 records the configuration changes in a chronology 505 in computer readable media 507. Flow-charted in FIG. 6 is an associated method M2 in accordance with an embodiment of the invention, a method segment M21 involves detecting $1^{st}$ through nth computer configurations. In method segment M22, respective descriptions of the configurations are generated and recorded in the chronology.

Herein, a "computer system" is a set of interconnected computers. A "computer" is a machine for manipulating data according to a list of instructions, known as a "program". A "partition" is all or part of a computer that can itself function as a computer, e.g., run its own instance of an operating system. If the partition results from configuring hardware into separate partitions, it is a "hard partition". If the partition results from software allocating computing resources it is a "soft partition". Herein, an unqualified "partition" can be hard or virtual.

A "virtual machine" is software that creates an environment between the computer platform and the end user in which the end user can operate application software. In other words, a "virtual machine" is software that runs on a host operating system that runs on hardware and on which a client operating system can run. Thus, a "virtual machine" allows an application to be run on an otherwise incompatible software/hardware platform.

"Clone" refers to the process of duplicating an existing data set or object. There are two typical types of cloning. Shallow cloning is a simple copy of the original maintaining references to the original data set or object's references. Changes to a shallow clone will affect both the orignial and the clone. Deep cloning is a full and independent duplication of the original which will remain unchanged if the original is changed following the cloning process. While the preceding discussion emphasizes "deep cloning", the invention also provides for recording the results of shallow cloning. "Restoring" refers to returning to a previous state.

Herein, "Configuration" refers to a persistent but changeable arrangement of functional units according to their nature, number, and chief characteristics. Often, configuration pertains to the choice of hardware, software, firmware, and documentation. "Configuration" is a relatively persistent type of state, e.g., as opposed to the contents of an instruction pipeline that can change millions of times per second. Herein, "functional unit" refers to servers, hard and virtual partitions, secure and other resource partitions, containers, bochs, separate servers using ignite or other bare metal provisioning technology, vmware, Wine ("Wine Is Not an Emulator" for running Windows software under Linux), separate physical servers using a storage area network (SAN), dynamic root disks (DRD) that provide one or more additional copies of the operating system image that will take effect upon a reboot, full disk images (dd), or other provisioning, virtualization, or partitioning scheme.

A "chronology" is an arrangement of states, from either earliest to latest or from latest to earliest; the "arrangement" can be indicated by time stamps or serial numbers. "Computer-readable media" is any media that can be read by a computer, typically solid-state memory and disk-based memory. A "representation" is something that represents something else, as a graphic element can stand for a computer component for method segment.

While the emphasis herein has been on servers and virtual machines, genealogical information can be gathered regarding computers generally and regarding other clonable software, including application programs. Herein, "cloned software" encompasses both source and target of a cloning operations. Other configuration changes can be controlled, monitored, and represented in the chronology databases. These include changes to physical and virtual partitions, changes to the host operating system, and changes in application programs. These and other variations upon and modification to the illustrated embodiments are provided for by the present invention, the scope of which is defined by the appended claims.

What is claimed is:

1. A computer system comprising:
    a set of computers including at least one computer providing for running one or more virtual machines, said set progressing through a series of configurations including virtual machine configurations; and
    a chronology generator for recording a chronology for said series of computer configurations in computer-readable media;
    wherein a new virtual machine configuration can arise because a virtual machine is cloned, said chronology means generating a multi-generational genealogy of virtual machines in response to a genealogy command; and
    wherein said chronology generator provides a measure of genetic diversity in said genealogy.

2. A computer system as recited in claim 1 wherein said modifications include upgrades, updates, or configuration changes.

3. A computer configuration chronology generation method comprising:
    detecting first through nth configurations of a computer system at respective times Tn, where n is an integer greater than 1 and Tn is later than T(n−1);
    generating and recording in a chronology respective descriptions of said configurations in association with their respective times Tn so that said configurations are concurrently represented in said chronology; and
    displaying a multi-generational genealogy indicating genealogical relations among cloned software entities characterized in said descriptions wherein said genealogy encompasses at least three generations, wherein generations can be distinguished by a cloning, an update, or a configuration change.

4. A method as recited in claim 3 further comprising generating a measure of diversity associated with said genealogy.

5. A method as recited in claim 4 wherein said measure is a function of the greatest number of genealogical node connections between family members.

6. A method as recited in claim 5 further comprising measuring the diversity of said family members.

7. A method as recited in claim 5 wherein said measuring involves determining a number of node connections between pairs of said family members.

8. A method as recited in claim 5 further comprising changing the diversity of said family in the event said diversity measure meets a certain threshold.

* * * * *